Nov. 17, 1959   G. B. CLIFT, JR   2,913,299
RECORDER WITH COMBINATION LATCHING AND TEARING ASSEMBLY
Filed Nov. 29, 1956   3 Sheets-Sheet 1

INVENTOR
Gilbert B. Clift, Jr.
BY Stevens, Davis, Miller & Mosher
ATTORNEYS

Nov. 17, 1959     G. B. CLIFT, JR     2,913,299
RECORDER WITH COMBINATION LATCHING AND TEARING ASSEMBLY
Filed Nov. 29, 1956     3 Sheets-Sheet 3
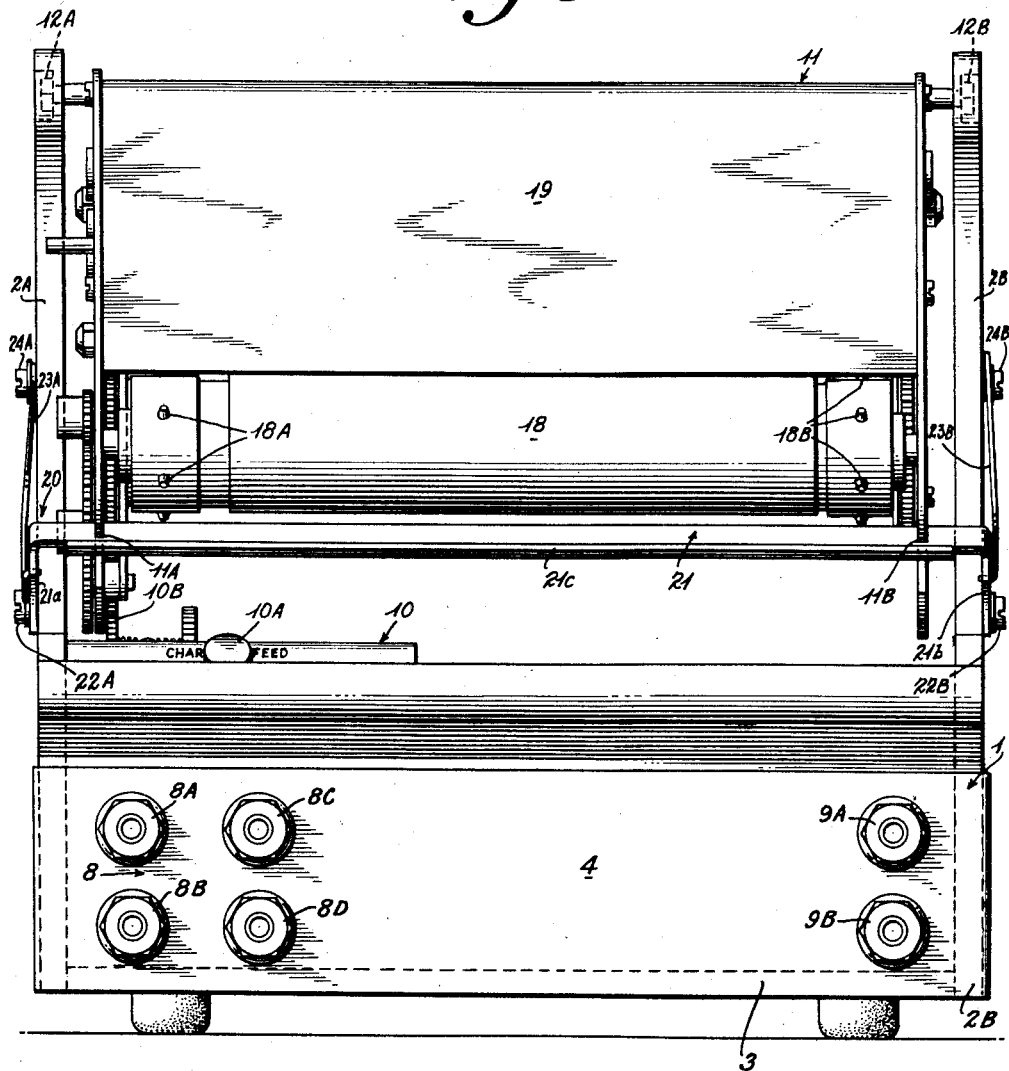
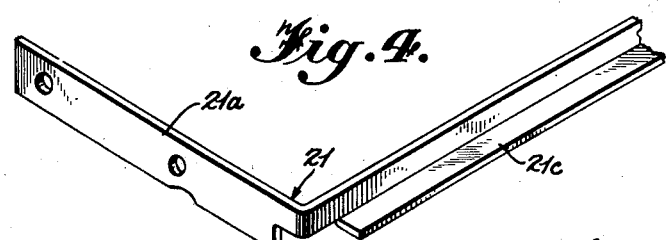
INVENTOR
*Gilbert B. Clift, Jr.*
BY *Stevens, Davis, Miller & Mosher*
ATTORNEYS

United States Patent Office

2,913,299
Patented Nov. 17, 1959

2,913,299

RECORDER WITH COMBINATION LATCHING AND TEARING ASSEMBLY

Gilbert B. Clift, Jr., Houston, Tex., assignor to Texas Instruments Incorporated, Dallas, Tex., a corporation of Delaware Application November 29, 1956, Serial No. 625,179

2 Claims. (Cl. 346—24)

This invention relates to the art of data recordation and more particularly to an improved device for use in conjunction therewith.

In many fields of science and technology, a graphic record of the variations with time of certain phenomena is required. Such a record may be obtained by applying this variation in the form of an electrical signal to a recording instrument which traces a pattern on a moving record chart. Some of the recording instruments commonly used for this purpose employ a pen which is physically deflected by a D'Arsonval type of galvanometer movement connected to respond to input signals. Other instruments apply the deflections of a galvanometer system to the movement of a light beam which is focussed on a moving strip of photosensitive paper. The present invention contemplates an improved device for use in such instruments. More particularly, novel means are provided for readily indexing the chart carrying member of the device out of its data receiving position, in order to expedite the installation of a fresh record chart therein. Other means are provided for latching the chart carrying member in data receiving position. In addition, by using the present invention, sections of the pattern traced on the record chart may be immediately inspected, and readily severed from the remainder of the record chart.

Accordingly, therefore, a primary objective of this invention is to provide an improved device for use in conjunction with graphic recordation of data.

Another object of the invention is to teach an ingenious combination for resiliently biasing a pivotally mounted chart carriage assembly in operative relationship for receiving data.

A further object of the invention is to disclose a recorder structure provided with means for expediting the severing of a record strip after the imprinting of received data thereon.

Other and further objects of the present invention will become apparent by reference to the following detailed description and drawings in which like numerals indicate like parts and in which:

Figure 3 shows a front view of the invention.

Figure 4 shows a construction of the latch member.

Figure 1:
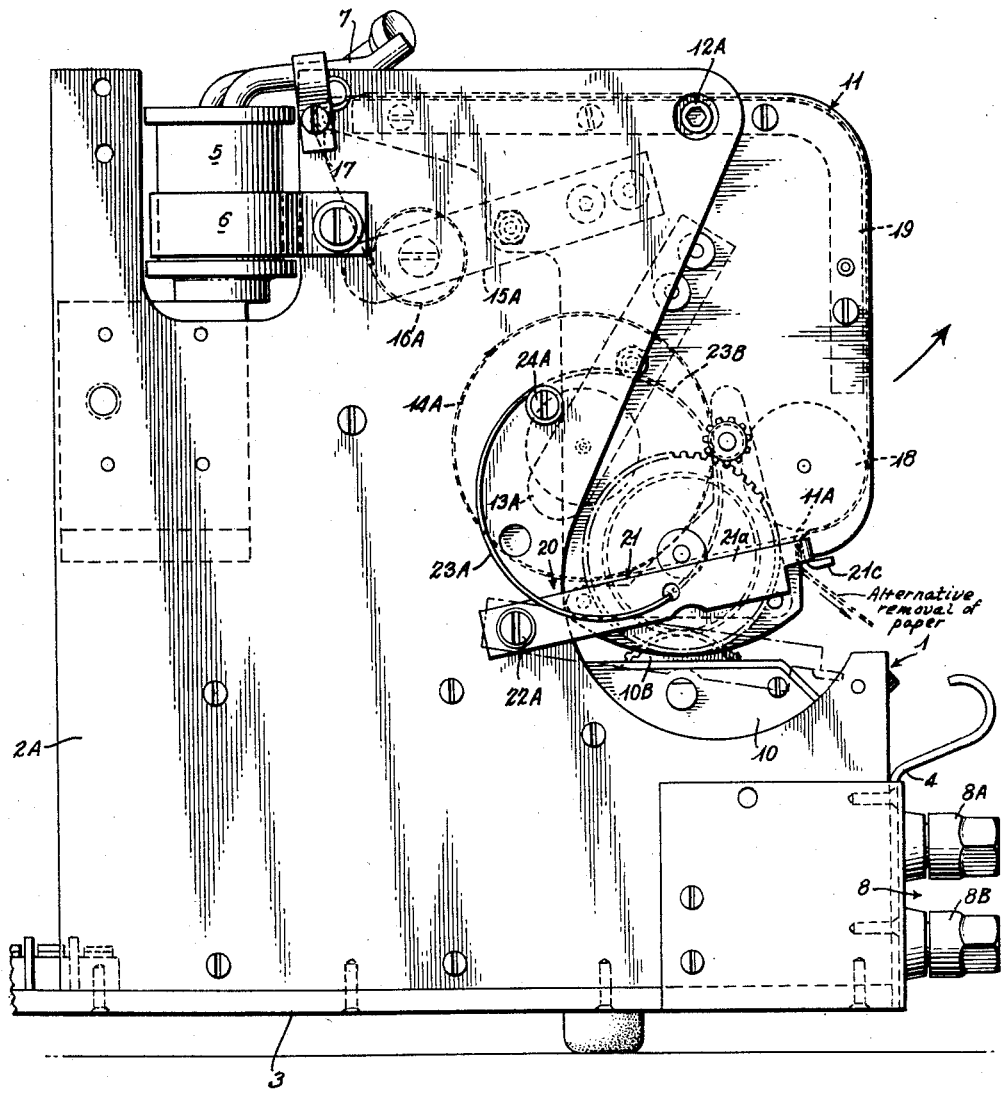
Figure 1 illustrates a side view of the inventive structure with the chart carriage assembly maintained in data receiving position by means of the chart carriage latch assembly.

Turning now to the drawings and more particularly to Figure 1 thereof, the numeral 1 indicates generally a frame assembly which includes side frames 2A and 2B on the left and right sides of the frame assembly, respectively. The right side details, it will be appreciated, are illustrated most clearly in the front view of the invention shown in Figure 3.

The left and right side frames 2A and 2B are securely fixed to a bottom member 3. In addition, a front frame plate 4 is fastened to the frame assembly in order to enclose a portion of the front of the assembly.

In the upper left hand portion of Figure 1, there is shown an ink well 5 which is secured to the side frame 2A by means of a loop clamp 6. It will be appreciated that the ink well 5 may provide a supply of ink to a suitable pen mechanism actuated by a D'Arsonval galvanometer movement (not shown). A filler tube assembly 7 is fastened to the side frame 2A for the purpose of replenishing the supply of ink within the ink well 5.

In the lower right hand corner of Figure 1 there are shown the left marker input terminals 8A and 8B. Directly adjacent the left marker input terminals, as shown most clearly in Figure 3, there are provided the right marker input terminals 8C and 8D. A pair of input signal binding posts 9A and 9B are located on the right hand side of the front frame plate 4, as shown most clearly in Figure 3 of the drawings, for applying signals to the internal mechanism of the device.

The frame assembly also includes a novel multispeed transmission 10 which is disclosed and claimed in copending U.S. patent application No. 625,182 filed Nov. 29, 1956, now Patent No. 2,847,866. This transmission includes a speed selector knob 10A and an output gear 10B. The output gear 10B may provide output torque at a plurality of different speeds, as governed by the relative position of the manually operable selector knob 10A.

Returning momentarily to the detailed description of Figure 1, the numeral 11 is used to indicate generally a chart carriage assembly.

Figure 2:
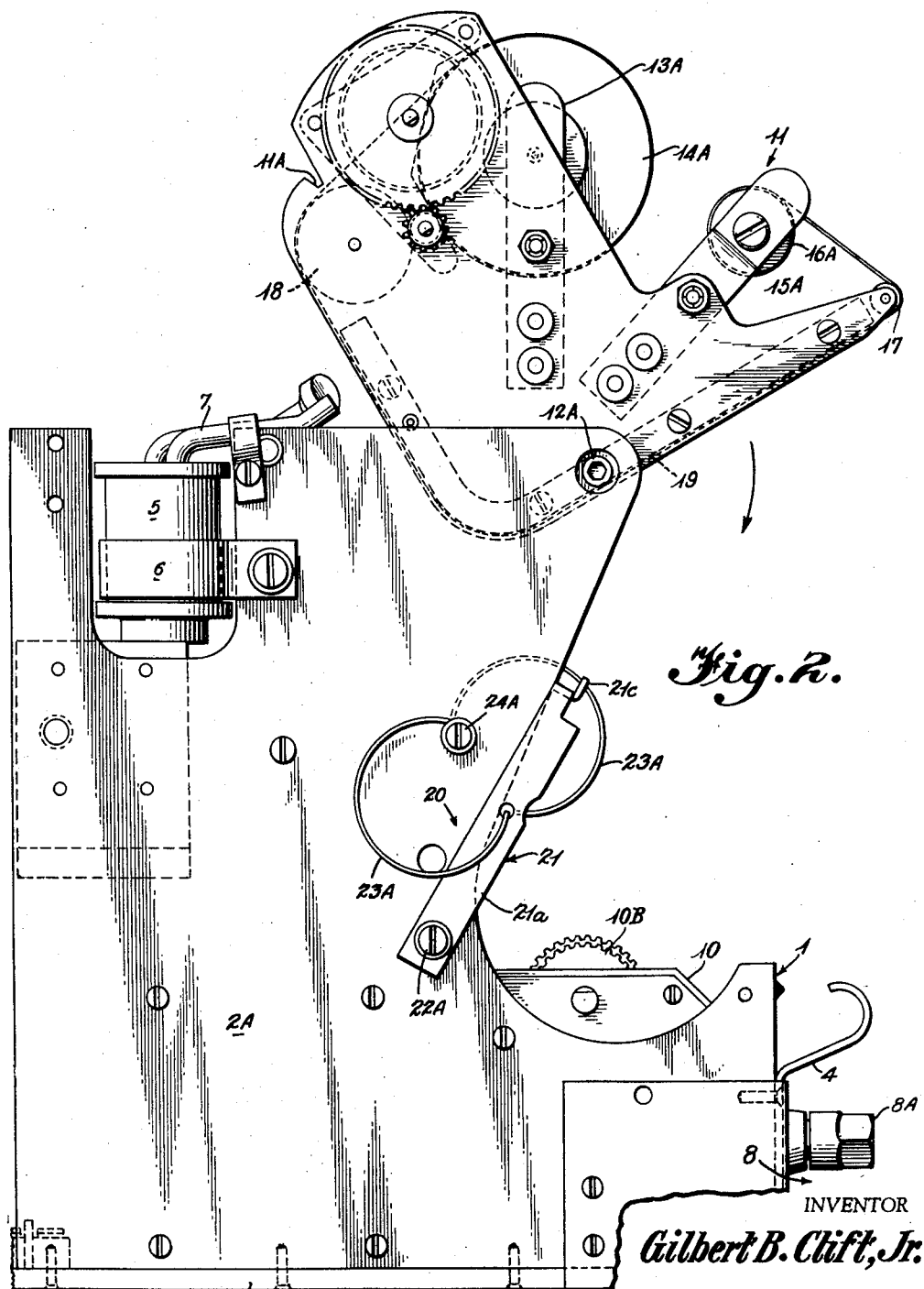
Figure 2 illustrates a side view of the preferred embodiment of the invention with the chart carriage assembly rotated counterclockwise upon the pivot assemblies.

The chart carriage assembly 11 shown in Figure 1 is suspended between the left and right side frames by means of the pivot assemblies 12A and 12B respectively. In completing the detailed description of the chart carriage assembly, reference will now be made to Figure 2 of the drawings. In Figure 2, the assembly 11 has been upwardly rotated out of data receiving relationship with the inscribing means provided in the recorder. It will be observed that the side members are provided with slots 11A and 11B for purposes presently to be described in detail. The position of the slot 11A is clearly shown to the left of the raised carriage assembly.

Paper roll spring assemblies 13A and 13B (not shown in Figure 2) are secured to the left and right sides of the carriage assembly.

A pair of discs, 14A and 14B, are affixed to the assemblies 13A and 13B, respectively, to engage and tightly abut a chart paper takeup reel (not shown). To the lower right of the carriage assembly there is shown a second paper roll spring assembly 15A. A matching spring assembly 15B is located on the right side of the assembly, and a pair of chart supply disk guides 16A and 16B are affixed to the paper roll spring assemblies 15A and 15B, respectively. Elements 13B, 14B, 15B and 16B, which are the right-hand counterparts of elements 13A, 14A, 15A and 16A, respectively, as referred to above, are not shown in the drawings, but would appear in a view similar to Figure 1 taken from the opposite side of the mechanism.

An upper roller 17 is provided, and extends transversely across the face of the assembly. Beneath the slot 11A a drive sprocket roller assembly 18 is journaled for rotation. The drive sprocket roller is provided with a plurality of spaced sprocket teeth at opposite ends thereof. In the front view of the drive sprocket roller shown in Figure 3, the position of these sprocket teeth on the roller is illustrated. There, the reference numerals 18A and 18B are used to indicate generally the sprocket teeth at the left and right ends respectively, of the roller 18.

In order to provide support for the moving record chart during operation, a writing platen 19 encases the top and a portion of the front of the chart carriage assembly.

Continuing with the detailed description of the invention, the numeral 20 is used in Figure 2 to indicate generally a chart carriage latch assembly. The latch assembly 20 may include a latch member 21 having side members 21a and 21b integrally joined with an elongated front bar 21c in order to form a substantially U-shaped member. It will be observed that the front bar 21c has been bent to provide a substantially L-shaped cross sectional profile. The latch member 21 is pivotally mounted upon the left and right side frames by means of suitable pivots 22A and 22B respectively. In addition, the latch member is resiliently biased on the left and right sides by means of the arcuate latch springs 23A and 23B, respectively. As seen from the drawings, the latch springs penetrate suitable holes provided in the side members 21a and 21b.

The springs 23A and 23B are pivoted on the left and right side frames by means of anchor bolts 24A and 24B, respectively. These anchor bolts may penetrate the side frames and threadedly engage suitable fastening means on the opposite side, such as conventional clinch nuts.

The utility of the chart carriage latch assembly is clearly seen in the various figures. For instance, in Figure 1, the chart carriage assembly has been rotated clockwise and downwardly, and slots 11A and 11B are engaged by the front bar 21c of the latch assembly. In the position shown, the portions of the chart which emerge after the tracing of the pattern thereon may be reeled onto the takeup mechanism contained within the carriage assembly, or alternatively, the emerging record chart may be disposed to feed directly under the front bar 21c for immediate inspection. With this mode of operation, sections of record chart may be easily and cleanly torn off, by using the L-shaped configuration of the front bar on the latch assembly as a straight edge for tearing.

In Figure 2, the chart carriage assembly has been indexed upwardly out of data receiving position, after disengagement of the latch assembly. It will be obvious from Figure 2 that by merely depressing the latch member 21 and rotating the carriage assembly clockwise, the unit may readily be restored to the operative position. The manner in which the resiliently biased front bar 21c nests in the slots 11A and 11B to maintain the carriage assembly in this position has been explained earlier in this patent specification.

From the above specification it will be evident that I have disclosed my invention in the full and clear and concise terms required by the statute. However, it will be equally obvious that certain modifications and substitutions and alterations may be made therein without deviating in any manner from the spirit and scope of the appended claims.

What is claimed:

1. In a recording instrument of the type adapted to record data on a movable chart, the improvement which comprises a frame assembly, a carriage assembly for supporting thereon a movable chart, said carriage assembly being pivotally mounted on said frame assembly for pivotal movement through an arc of greater than 180 degrees with respect to said frame assembly, said carriage assembly having a pair of slots at the opposite sides thereof, a substantially U-shaped latch member pivotally mounted upon said frame assembly and having an L-shaped cross member, one portion of said L-shaped cross member being engagable with the slots of said carriage assembly to hold said carriage assembly in a fixed position, another portion of said L-shaped cross member providing a straight tearing edge for said chart, and means resiliently urging said crossbar into said slots to retain said carriage assembly in said fixed position.

2. In a recording instrument of the type adapted to record data on a movable chart, the improvement which comprises a frame assembly, a chart, a carriage assembly including a chart transport means for movably supporting said chart, means mounting said frame assembly and said carriage assembly for relative pivotal movement, a combination latch and tearing member pivotally mounted on said frame assembly, said carriage assembly including seating means to receive portions of said combination latch and tearing member, means resiliently urging said combination latch and tearing member into said seating means to retain said carriage assembly in a fixed position relative to said frame assembly, said combination latch and tearing member, when in latched positon, having a portion defining a straight tearing edge extending transversely across and adjacent to said chart, and means mounted on said frame assembly positioned to engage and drive said chart transport means and move said chart when said carriage assembly is latched to said frame assembly.

References Cited in the file of this patent

UNITED STATES PATENTS

| 2,510,306 | Bachelder | June 6, 1950 |
| 2,669,501 | Young et al. | Feb. 16, 1954 |

FOREIGN PATENTS

| 58,431 | Norway | Sept. 27, 1937 |
| 302,656 | Germany | Dec. 15, 1917 |